US011025803B2

(12) United States Patent
Choi et al.

(10) Patent No.: US 11,025,803 B2
(45) Date of Patent: Jun. 1, 2021

(54) APPARATUS FOR CAPTURING ANIMAL NOSE PATTERN IMAGES ON MOBILE DEVICES

(71) Applicants: ISCILAB CORPORATION, Seoul (KR); Stephanie Sujin Choi, Seoul (KR)

(72) Inventors: Stephanie Sujin Choi, Seoul (KR); Namsook Wee, Seoul (KR)

(73) Assignee: ISCILAB CORPORATION, Seoul (KR)

(*) Notice: Subject to any disclaimer, the term of this patent is extended or adjusted under 35 U.S.C. 154(b) by 0 days.

(21) Appl. No.: 16/649,267

(22) PCT Filed: Oct. 11, 2017

(86) PCT No.: PCT/US2017/056100
§ 371 (c)(1),
(2) Date: Mar. 20, 2020

(87) PCT Pub. No.: WO2019/074496
PCT Pub. Date: Apr. 18, 2019

(65) Prior Publication Data
US 2020/0236267 A1    Jul. 23, 2020

(51) Int. Cl.
*A01K 11/00* (2006.01)
*H04N 5/225* (2006.01)
(52) U.S. Cl.
CPC ....... *H04N 5/22521* (2018.08); *H04N 5/2254* (2013.01); *H04N 5/2256* (2013.01); *H04N 5/2257* (2013.01)

(58) Field of Classification Search
CPC ............. H04N 5/22521; H04N 5/2254; H04N 5/2256; H04N 5/2257; H04M 1/0264
See application file for complete search history.

(56) References Cited

U.S. PATENT DOCUMENTS

| 2002/0116390 A1 | 8/2002 | Meadows |
| 2012/0320340 A1 | 12/2012 | Coleman, III et al. |
| 2013/0141640 A1* | 6/2013 | Kim ...................... H04W 76/10 348/375 |

(Continued)

OTHER PUBLICATIONS

Search Report, dated Dec. 28, 2017, for International Application No. PCT/US2017/056100.

(Continued)

*Primary Examiner* — Thai Q Tran
*Assistant Examiner* — Jose M Mesa
(74) *Attorney, Agent, or Firm* — LRK Patent Law Firm

(57) ABSTRACT

An apparatus for capturing animal nose pattern images on a mobile device using a camera embedded in the mobile device and a mount unit attached to the mobile device that facilitates simple and secure attachment onto the mobile device. A shell unit connects and encloses a space between the animal nose and the camera of the mobile device. A lens attachment unit placed over the camera and having one or more lenses allows a regular mobile device camera to take animal nose pattern images with no internal hardware modification. An illumination unit provides additional light to improve an image quality. The mount unit is a mechanism by which the shell unit, the lens attachment unit and the illumination unit are fastened onto the mobile device.

27 Claims, 25 Drawing Sheets

(56) References Cited

U.S. PATENT DOCUMENTS

| | | | |
|---|---|---|---|
| 2014/0097251 A1 | 4/2014 | Joussen et al. | |
| 2015/0078626 A1* | 3/2015 | Kinard | G06K 9/00617 |
| | | | 382/110 |
| 2015/0254861 A1* | 9/2015 | Chornenky | H04M 1/0264 |
| | | | 348/135 |
| 2016/0095292 A1 | 4/2016 | Hosseini | |
| 2016/0259970 A1* | 9/2016 | Wee | A61B 5/6819 |
| 2016/0367135 A1 | 12/2016 | Myung et al. | |
| 2017/0038504 A1* | 2/2017 | Tsai | G02B 13/24 |

OTHER PUBLICATIONS

Written Opinion, dated Dec. 28, 2017, for International Application No. PCT/US2017/056100.

* cited by examiner

FIG. 1
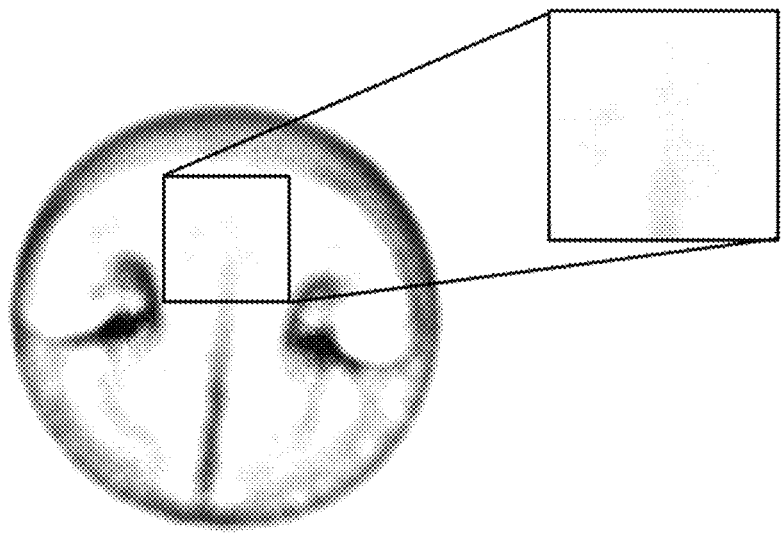
(a)
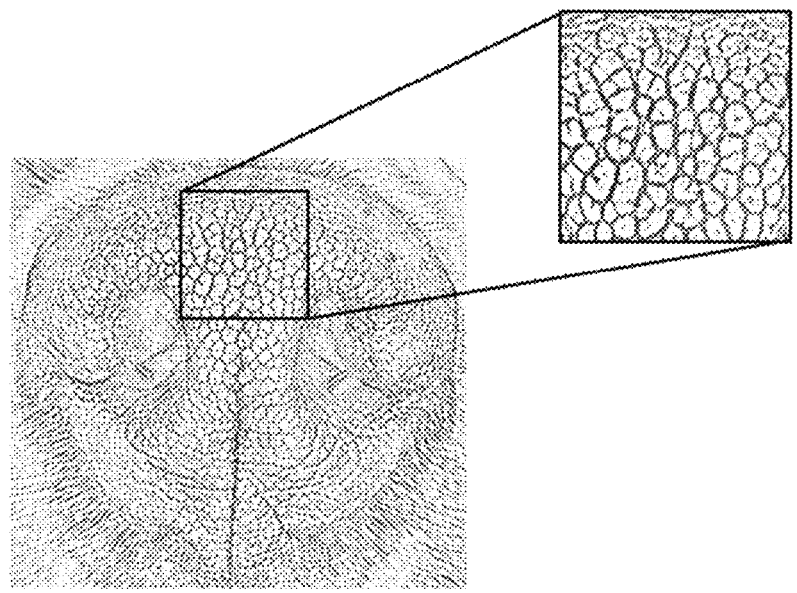
(b)

FIG. 4
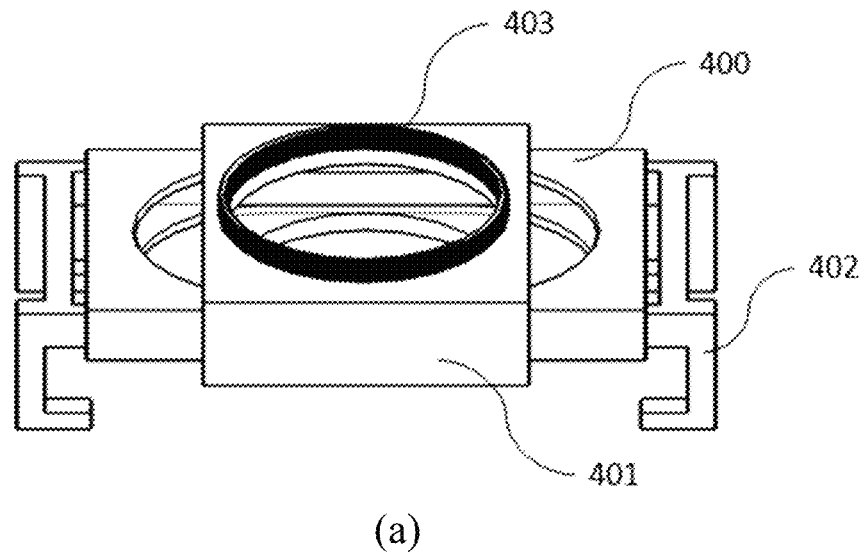
(a)
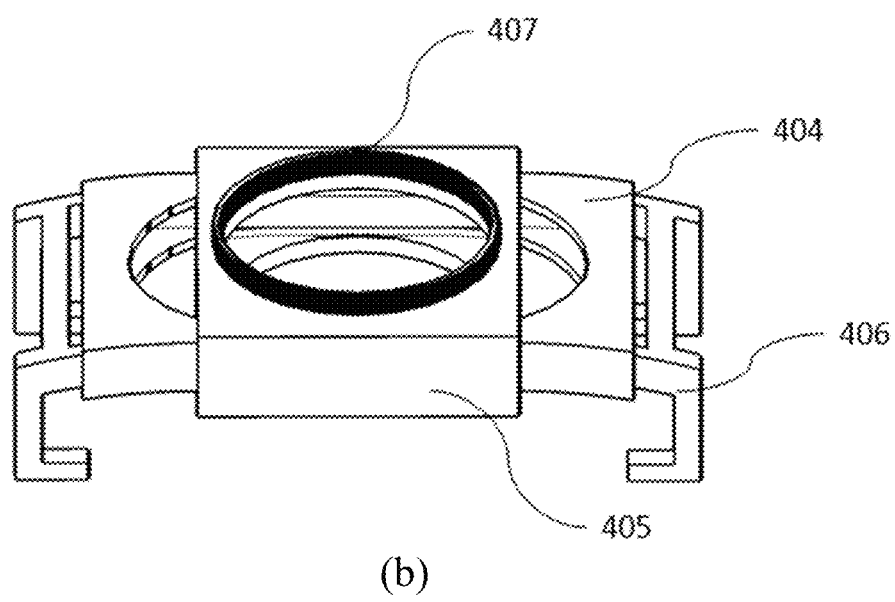
(b)

FIG. 5
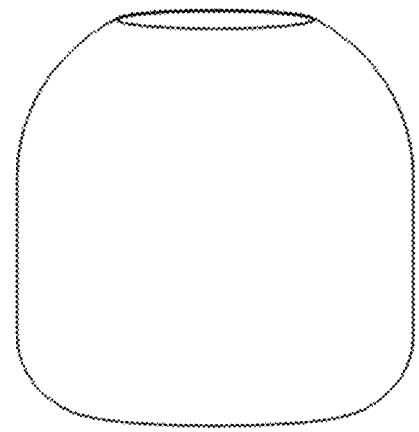
(a)
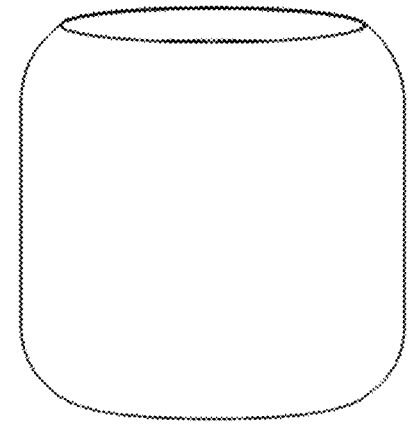
(b)
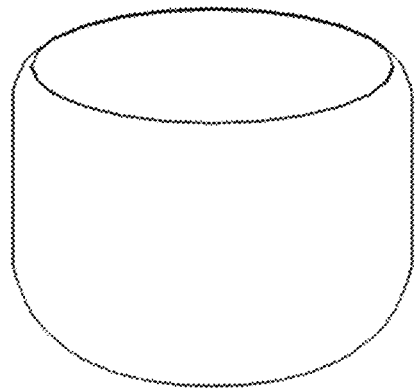
(c)

FIG. 10
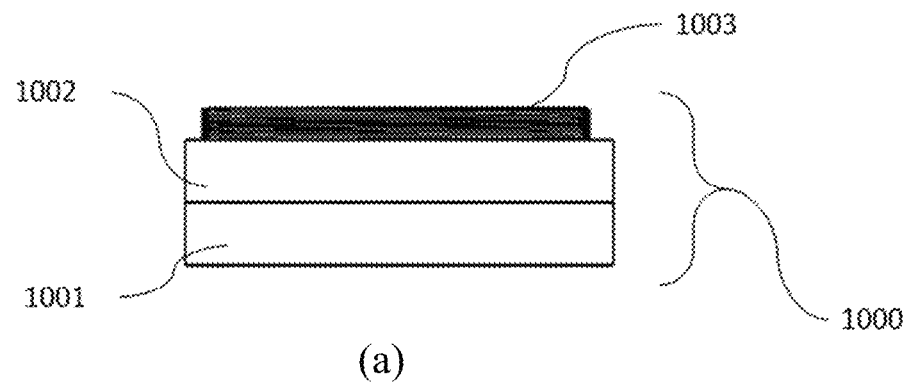
(a)
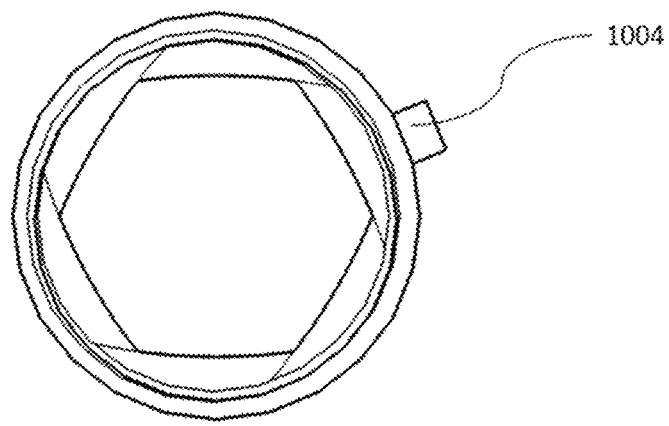
(b)
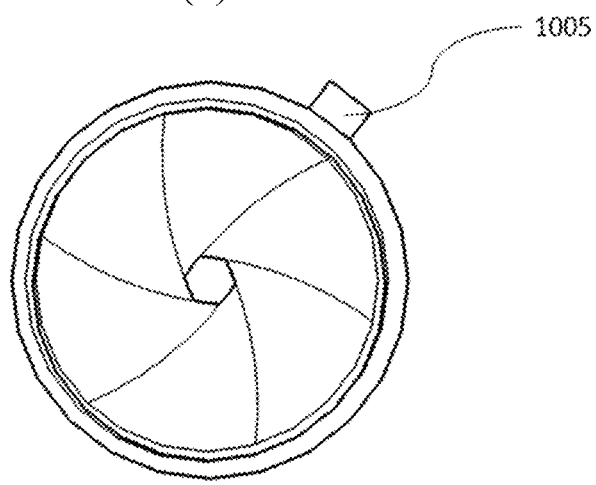
(c)

FIG. 11
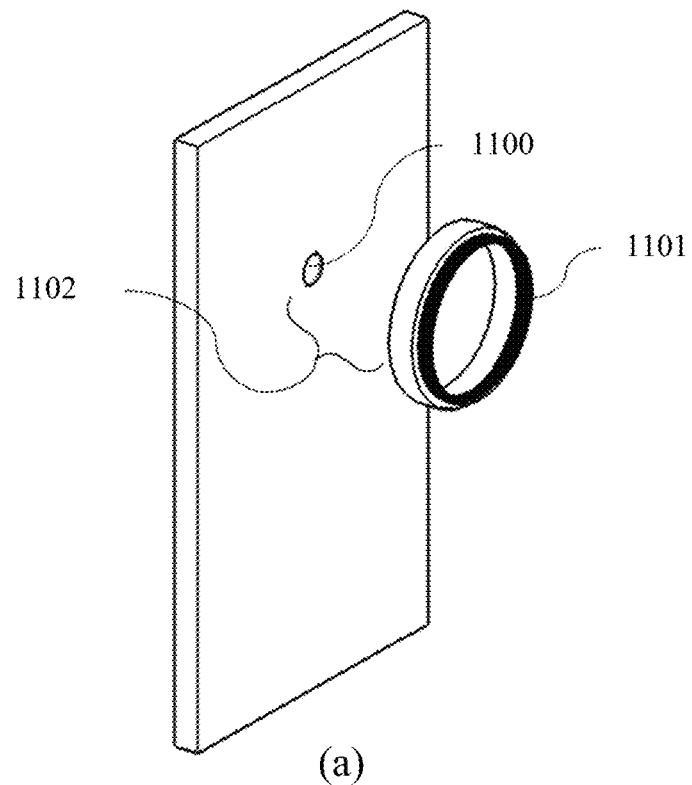
(a)
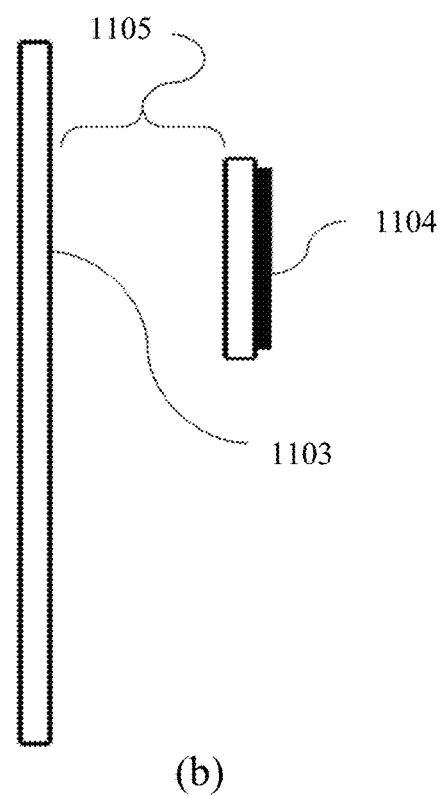
(b)

FIG. 12
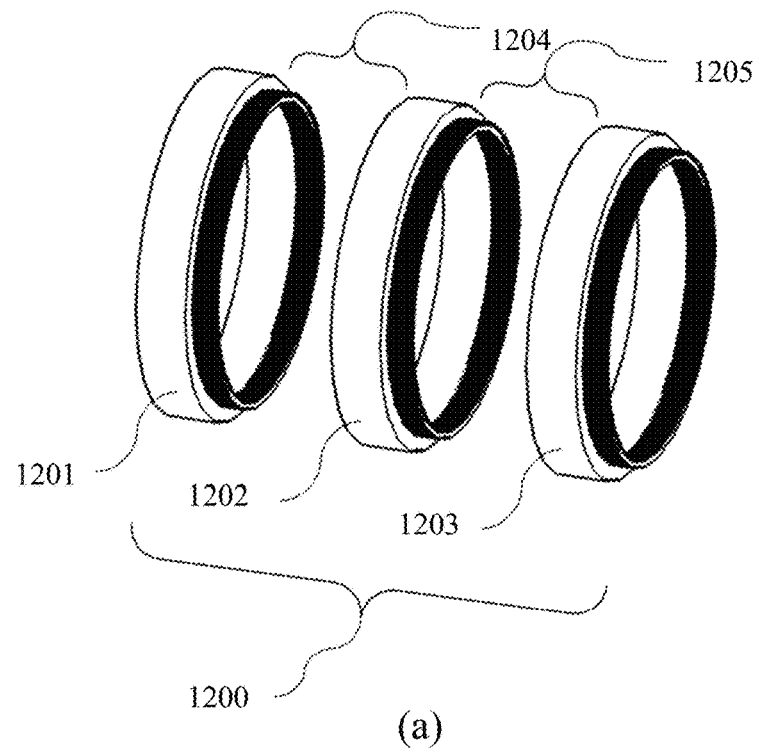
(a)
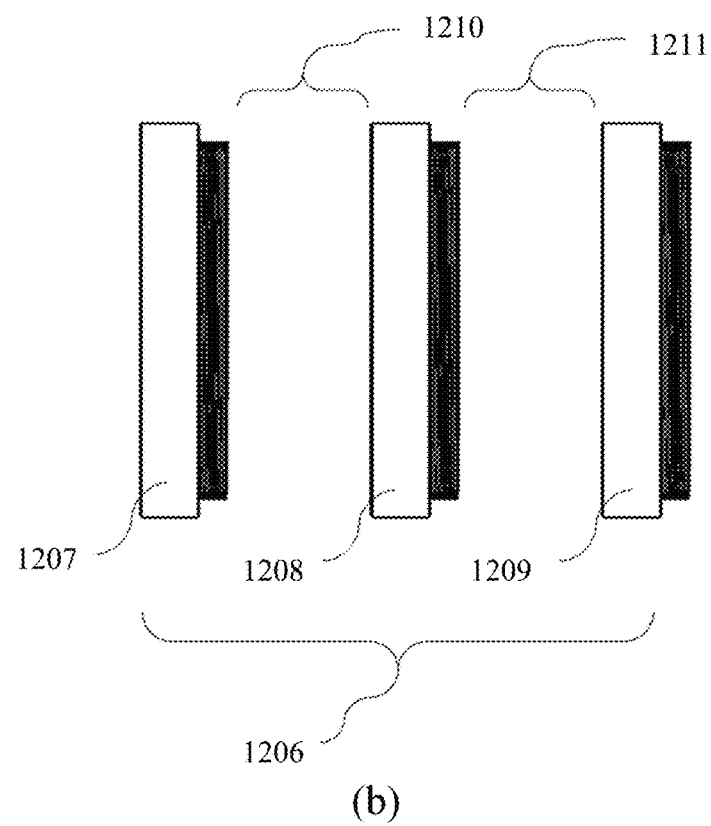
(b)

FIG. 15
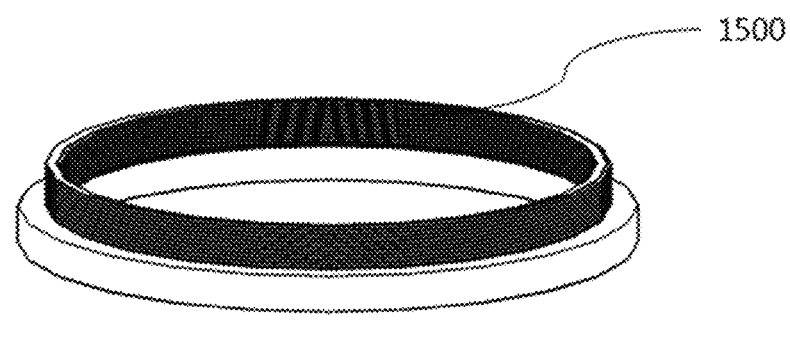
(a)
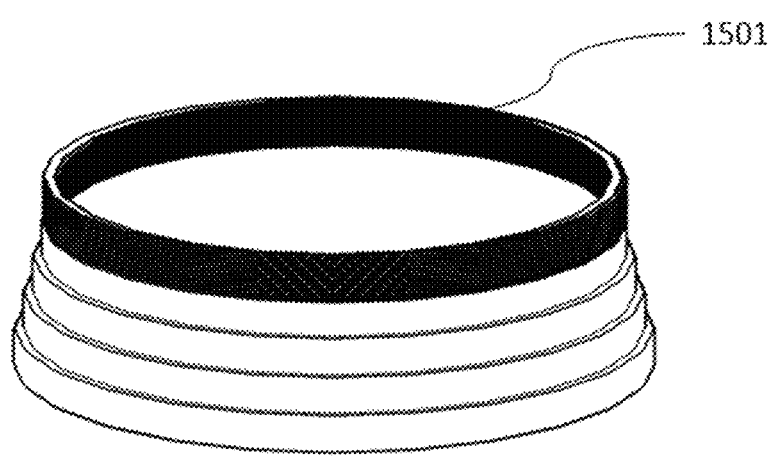
(b)

FIG. 17
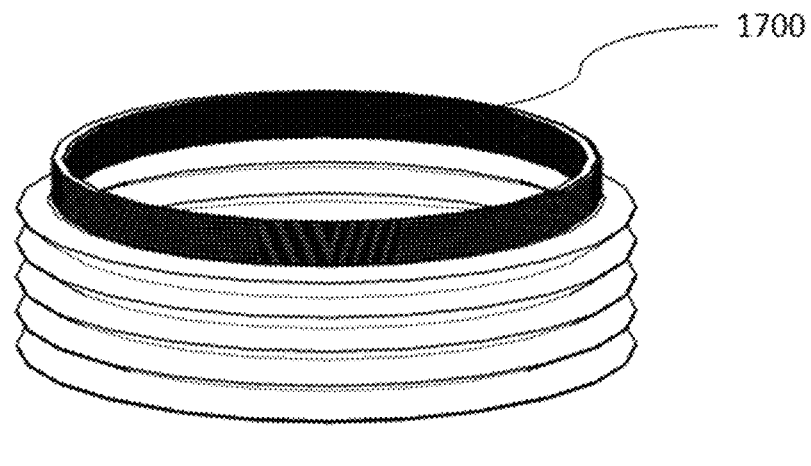
(a)
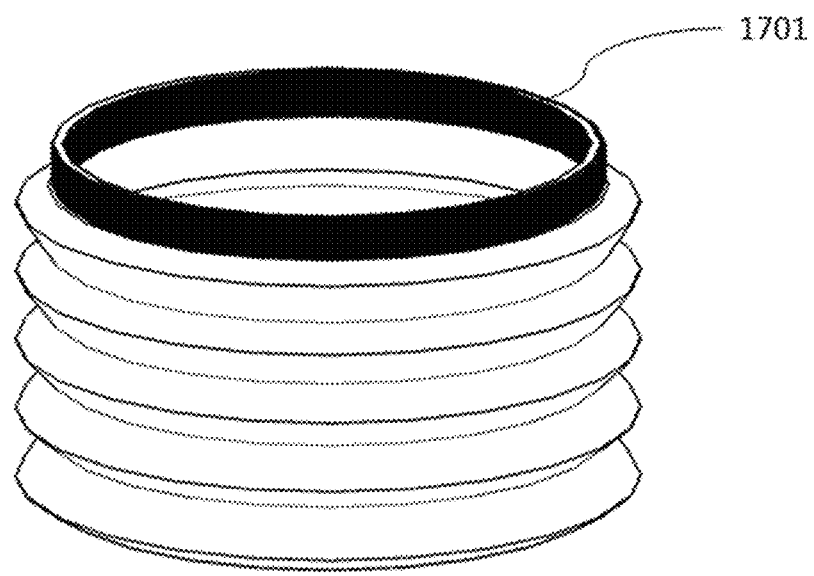
(b)

FIG. 24
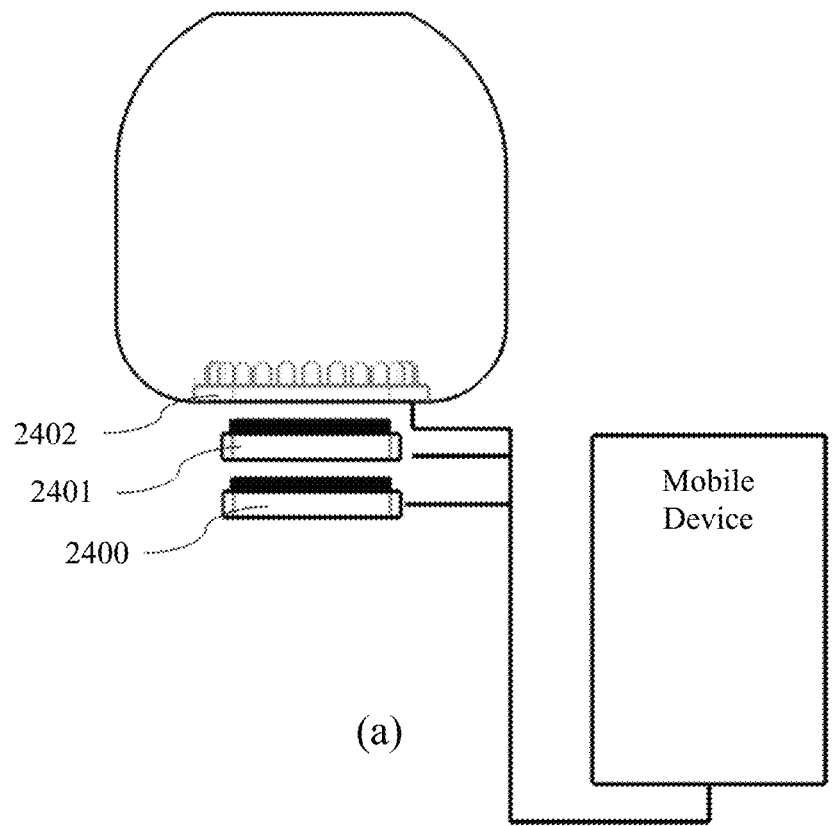
(a)
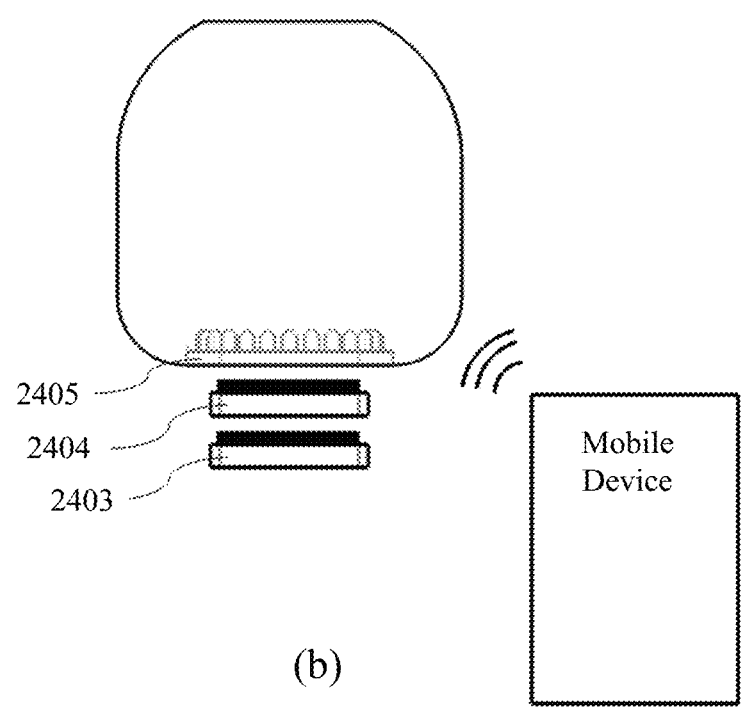
(b)

APPARATUS FOR CAPTURING ANIMAL NOSE PATTERN IMAGES ON MOBILE DEVICES

CROSS-REFERENCE TO RELATED APPLICATION

The present application is a U.S. National Phase entry from International Application No. PCT/KR2017/056100, filed Oct. 11, 2017, the disclosure of which is incorporated by reference herein in its entirety.

BACKGROUND OF THE INVENTION

1. Field of the Invention

The present invention relates to an apparatus for capturing animal nose pattern images on mobile devices. Moreover, the present invention relates to the use of lens adapters and/or additional illumination in conjunction with the mobile device camera to acquire high quality nose pattern images.

2. Description of Related Art

It is known that the nose pattern of certain animals—almost all species belonging to the Ruminantia, Caniformia, and Feliformia suborders—is unique to each individual, just as the fingerprint pattern is unique to each individual human being. Thus there have been attempts to utilize the uniqueness of nose patterns to develop an animal nose pattern recognition system. To this end, the first step is to acquire the animal nose pattern image, and for that there are two basically different approaches: contact type and non-contact type.

The contact-type method obtains nose images either by the application of a pigment onto the nose for a contact impression print, or by using a capacitive touch sensor as used for fingerprints. The ink impression method has been used for a long time in places like Japan to identify cows, yet not only is it a rather cumbersome and delicate process that requires skill, but also impractical and inaccurate for an animal with a small nose. Moreover, the contact method runs the risk of creating distorted impressions from applying too much or uneven pressure onto the nose.

The more recent, non-contact approach is to use cameras to take pictures of the nose at a reasonably close distance. However, it may be an impractical option for an average user as it requires special dedicated camera and hardware. On the other hand, mobile devices such as smart phones and tablets with built-in cameras present a very convenient and economical alternative. When coupled with apps, there are a lot of advantages to using these mobile devices over dedicated systems: no need for an average consumer or pet owner to visit a specialized office; cheapest mass deployment; and ubiquitous presence, as anyone at any time can make use of the technology.

Mobile device cameras nowadays are high-functioning on their own, and are meant to accommodate all the typical photographing situations of the average user. While independent camera devices, like DSLRs, are easily modifiable with interchangeable parts to fit the subject and circumstances, a mobile device camera is more of a one-size-fits-all deal with definite limitations. For more specific purposes, like macro photography, there are attachment options that enhance the camera capabilities in a certain way.

However, most mobile device cameras, especially the rear-facing ones, naturally are designed not for this specific purpose. For instance, most animals have noses that are curved, which requires deeper depth of field to capture the nose in focus from front to back. Also, since most noses are very small, magnification capability is required in the camera; but the cameras of many mobile devices may not have an adequate range of focal depth and field of view. Stray light may also reflect off the wet surface of the nose, which could be a hindrance to getting good quality images.

To overcome such difficulties, this invention introduces an auxiliary apparatus that can be attached to a mobile device to facilitate the acquisition of high quality nose pattern images. This apparatus is a simple one that forgoes the necessity of any modifications to the mobile device's hardware and also is universally compatible with all sorts of mobile device cameras.

SUMMARY OF THE INVENTION

An auxiliary apparatus for mobile devices, such as smart phones and tablets, for capturing animal nose pattern images is provided. It is attached to the exterior of the mobile device so as not to require any change to the mobile device itself. Its basic configuration is the combination of the mount unit and the shell unit. The mount unit, to which the shell unit is attached, grabs hold onto the frame of the mobile device. This mount unit, and hence the entire auxiliary apparatus, can be detached from the mobile device when it is not being used for the purpose of nose pattern image capture. The mount unit is designed to fit mobile devices of any size and the location of rear camera thereof.

The shell unit, whose length and opening size can be adjusted for the target animal, serves as a controlled image acquisition environment for capturing good quality nose pattern images by blocking out stray lights and providing an even lighting condition within. It also helps the user by providing a guide for the correct aiming of the camera and the correct focal (capture) distance.

The camera used to capture the animal nose pattern image is the built-in one in the mobile device. Many, if not all, may not be adequate for this purpose, as animal noses are curved three-dimensional objects that can also often be very small. To remedy this situation, the present patent provides an additional lens attachment unit. With judicious selection and adjustment of the lens module the user can adjust the focal length, focal depth and the field of view to best fit the target animal. In particular with an additional macro lens, the user may take images with a sufficiently high resolution of small noses.

The shell unit can be made translucent to evenly let through ambient light (i.e. light consistently present outside the shell), while blocking out stray lights (i.e. sudden flashes of light from camera flashes, passing cars, etc.) that cause stark reflections off the wet surface of the animal nose. If, however, the surrounding environment is not sufficiently bright, the luminosity through the translucent shell may not be enough to acquire clear, good quality nose pattern images. For this purpose, this invention provides an illumination unit. This illumination unit, which comes in many shapes and forms, provides additional direct or indirect light sources. This invention also provides an aperture control mechanism to adjust depth of field, as well as to minimize light intake to avoid intense light reflections.

Power may be provided for electronically controlled components, such as illumination, through different means: disposable battery, rechargeable battery, or power drawn from the mobile device itself. A control unit is also provided, to control pertinent user choices such as the luminosity and lighting pattern of the illumination unit, aperture opening, liquid lens convexity, and others.

Animal nose pattern images acquired on a mobile device using the present invention, or nose pattern templates generated from said acquired images, may be used for matching against other images or templates to identify or verify the identity of the source individual animal unit.

BRIEF DESCRIPTION OF THE DRAWINGS

While the specification concludes with claims particularly pointing out and distinctively claiming the subject matter of the present invention, it is believed the invention will be more clearly understood from the following detailed description taken in conjunction with the accompanying drawings, wherein:

FIG. 1 shows a bad quality nose pattern image (a) and a good quality nose pattern image (b) and their respective close-up views;

FIG. 4 illustrates a configuration of a mount unit, in which (a) and (b) further illustrate the flexibility of the mount unit;

FIG. 5 illustrates different sizes of shells for an interchangeable-type shell unit;

FIG. 10 shows a lens attachment unit with a lens module subunit and an aperture subunit, in which (b) and (c) further illustrate enlarged views of an aperture unit at two different opening width settings;

FIG. 11 illustrates the distance between the mobile device camera and the lens module subunit;

FIG. 12 illustrates the distance between lenses within the lens module subunit;

FIG. 15 illustrates isolated views of the collapsed and expanded forms of a telescope-type focus adjuster subunit;

FIG. 17 illustrates isolated views of the collapsed and expanded forms of an accordion-type focus adjuster subunit;

FIG. 24 illustrates an embodiment of a communication subunit used to control an illumination unit, liquid lens, and an aperture subunit.

DETAILED DESCRIPTION OF THE EMBODIMENTS

Figure 2:
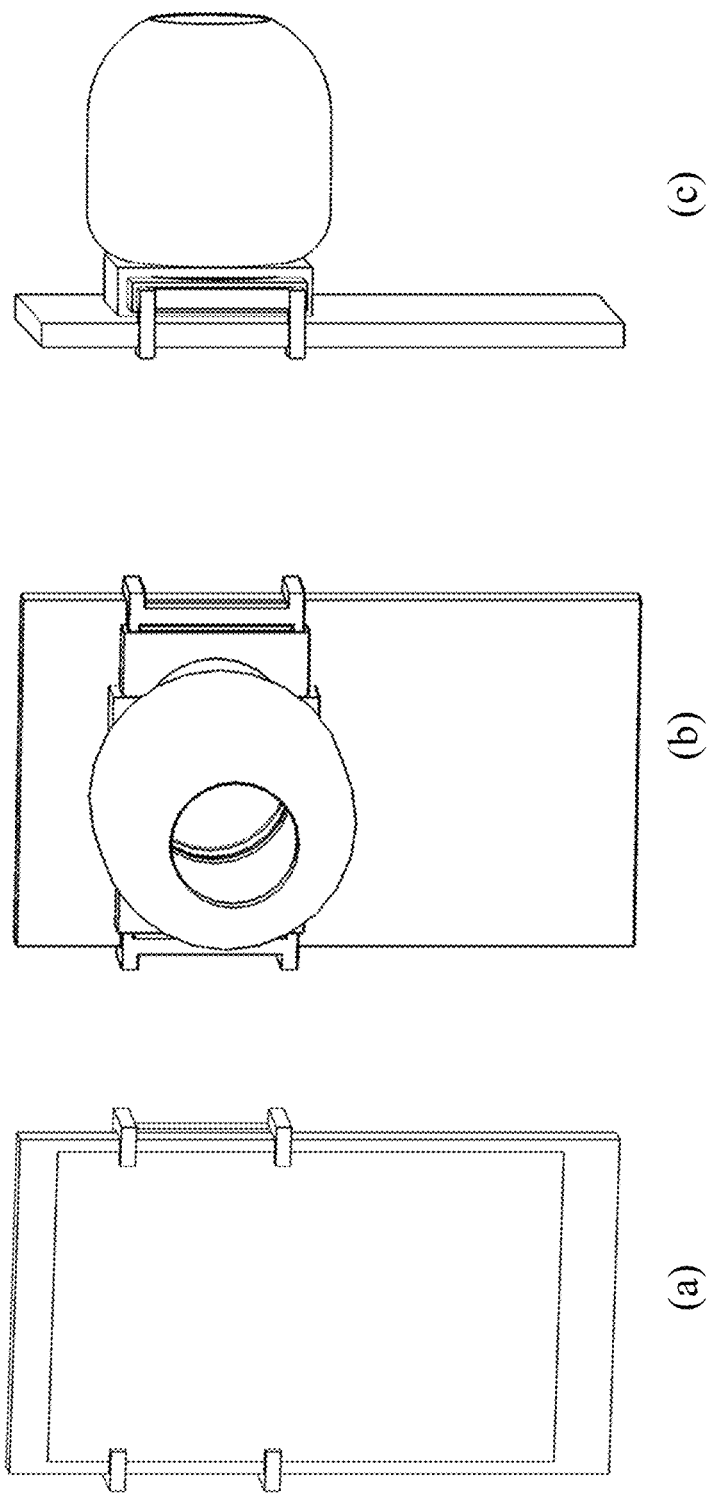
FIG. 2 illustrates an apparatus seen from different angles.

In the following description, numerous specific details are set forth. However, it is to be understood that any reasonable variations of the embodiments of the invention that retain the core concept should be considered within the scope of the present disclosure.

The meaning of specific terms or words used in the following sections should not be limited to the literal or commonly employed sense, but should be interpreted within the appropriate context. For instance, the indefinite articles "a" and "an" preceding an element or component of the invention are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

Whereas the non-contact method of nose pattern image acquisition is superior to the various contact methods in terms of hygiene, convenience, and not causing distortions in the image due to applying pressure on the nose, it is not inherently without obstacles.

Animal nose has an intertwining pattern of beads (extruding-out parts) and grooves (valleys between beads). When the nose image is taken with a camera, the grooves typically become darker whereas the beads are brighter. In FIG. 1, (b) exhibits an easily discernible pattern of beads and grooves that can be used to differentiate one individual animal from another either by human eye or algorithmically. However, a bad quality image, as shown in (a) of FIG. 1, acquired without the proper equipment or settings depicts no such discernible pattern, which makes it unusable in biometric identification.

Hence, FIGS. 2-22 illustrate a portable photographic apparatus for capturing animal nose pattern images that comprises a mount unit attached to a mobile device with a camera, wherein the camera captures the animal nose pattern images. The mobile device camera is preferably a rear-facing one, as exemplified in FIG. 11, wherein the opening of the apparatus may align with the built-in lens of the mobile device camera to modify the digital image captured by the mobile device.

The cameras on most current mobile devices alone are capable of capturing nose images with discernible patterns in high enough resolution, but rarely in the form necessary for accurate biometric pattern recognition. Ideally the image quality should be consistent, with the only "variable" being the nose patterns themselves. However, contextual variables such as ambient light, stray lights from passing cars or the LED on the mobile device, and even wind result in obstructive elements like bright reflections and facial hairs in the nose images. Therefore, to be able to reliably capture usable nose pattern images requires keeping a controlled photographing environment; and the objective of the present disclosure is to provide a minimal and portable means for doing so.

The present art in its simplest form consists of a mount unit attached over the camera of a mobile device. The mount unit is the connecting piece between the mobile device and any auxiliary parts that would enable the embedded mobile device camera to acquire nose pattern images of the high quality that is unattainable with the given camera alone.

FIG. 2 illustrates the addition of a shell unit onto the basic concept of the attachment apparatus, seen from the front, rear, and side as it is mounted on a mobile device.

Figure 3:
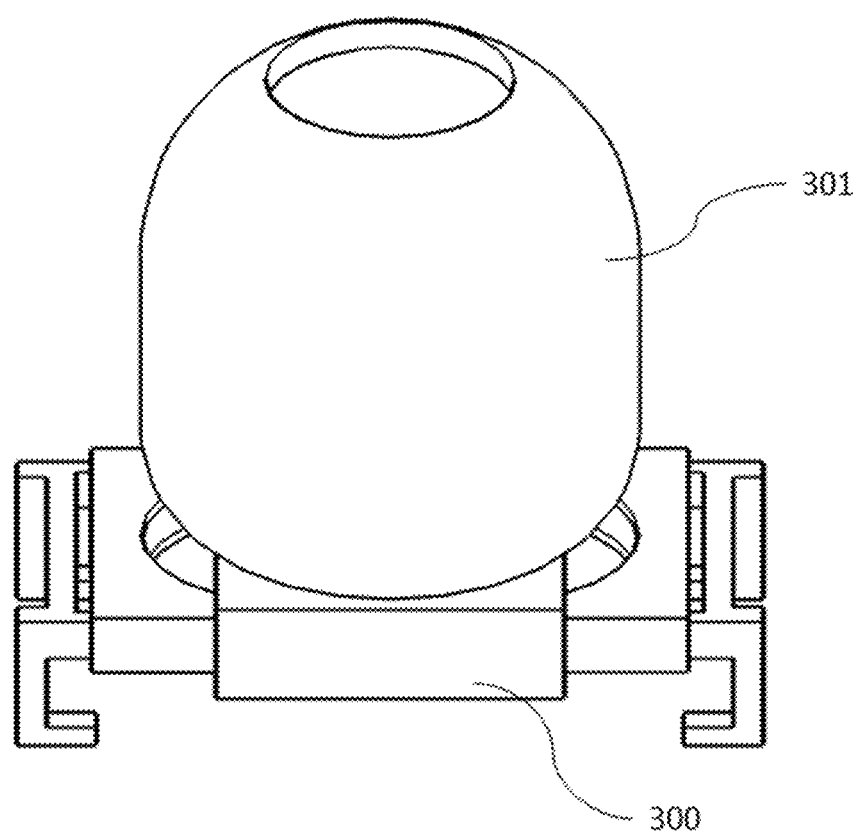
FIG. 3 illustrates an apparatus comprising a shell unit and a mount unit.

FIG. 3 further illustrates the assembly view of the basic apparatus with a mounted shell unit 301 that connects and encloses a space between the animal nose and the mobile device camera, and the mount unit 300 that is the means for removably attaching the auxiliary apparatus to the mobile device. The shell unit, which spans and encloses the space between the animal nose and the mobile device camera, assists in positioning and stabilizing the mobile device and attachment system on the subject animal's nose, and provides a uniform capturing environment within the enclosure during each capture session. The shell unit 301 may comprise different levels of opacity; it may be completely opaque and evenly block out all light, somewhat translucent and evenly let some of the ambient light in, or completely transparent to let in all outside light.

As shown in FIG. 4, the mount unit further comprises a base subunit 400, 404, a slider subunit 401, 405, a primary mount subunit 402, 406, and a secondary mount subunit 403, 407. The base subunit 400, 404 is the core onto which every other part of the apparatus is connected. The slider subunit 401, 405 slides laterally along the base subunit 400, 404 to allow positioning right on top of the mobile device camera, the location of which varies from model to model. The secondary mount subunit 403, 407 is attached to the slider subunit 401, 405; and it may take the form of a screw spiral as shown in the sample drawing so that additional parts, like the shell unit 301, may be mounted. The interior of the slider subunit 401, 405, base subunit 400, 404 and primary mount subunit 402, 406 is hollow to avoid obstructing the camera. The primary mount subunit 402, 406 extends in and out of the base subunit 400, 404 on each side to fasten onto the edges of the mobile device, and is forked at the end of the legs to prevent hitting side buttons. Moreover, as demonstrated by (b) of FIG. 4, the base subunit 400, 404 and primary mount subunit 402, 406 are both somewhat flexible so that they may accommodate phones with a curved back.

Meanwhile, in order to properly deal with differently sized noses, it is practical that the shell unit be size-adjustable. Since the idea is to shut out unwanted external light, a shell with an opening too big or too small for a particular subject animal nose would be ineffective.

FIG. 5 illustrates the embodiment of the shell unit wherein the size of the opening is adjusted by way of using interchangeable shells of different sizes. In FIG. 5, (a) is an example of a small shell with a small-sized opening to fit a small nose; (b) of a medium shell with a medium-sized opening to fit a medium nose; and (c) of a large shell with a large-sized opening to fit a large nose; where each may be removably attached to the mount unit.

Figure 6:
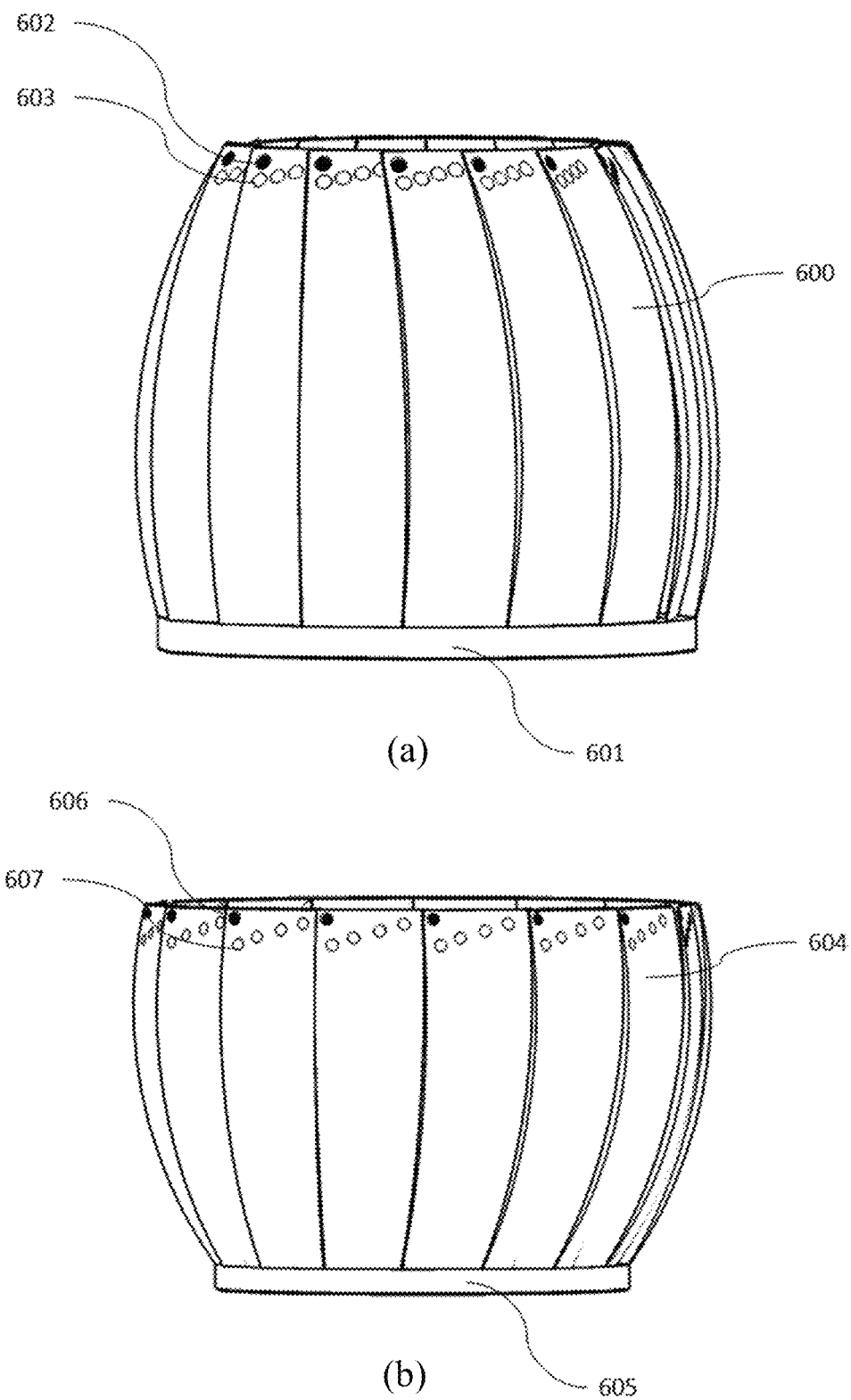
FIG. 6 illustrates a shell unit in aperture-type form in tightened and loosened positions.
Figure 7:
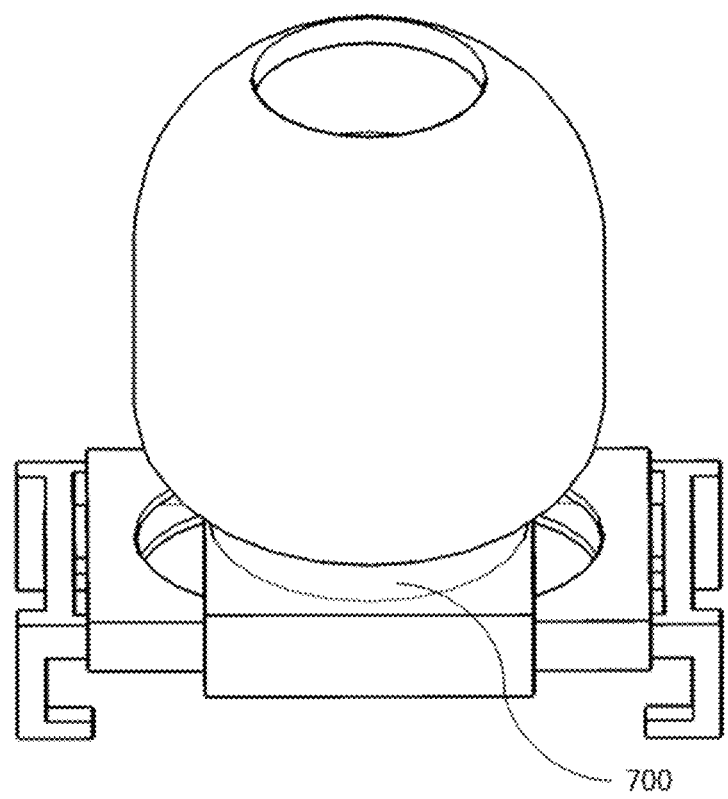
FIG. 7 illustrates assembled views of an apparatus comprising a shell unit, a mount unit, and a lens attachment unit.

Another embodiment of the shell unit is the aperture-type form that can be tightened or loosened to adjust the size of the opening of the shell unit, as illustrated in FIG. 6. A plurality of overlapping flaps 600, 604 are pivotally connected to an aperture shell base ring 601, 605, and each of the said flaps 600, 604 has an end pin 602, 606 at one end at the top and a plurality of spaced openings 603, 607 through which the end pin 602, 606 of an adjacent flap 600, 604 may be inserted to fix the position and angle of each flap 600, 604 in relation to each other and the aperture shell base ring 601, 605. The flaps 600, 604 may be simultaneously pivoted inward toward the center to achieve a tightened, narrow opening for the subject animal nose, as in (a) of FIG. 6, or pivoted outward away from the center to achieve a loosened, wider opening, as in (b) of FIG. 6.

However, with or without a shell unit 301, the mobile device camera by itself may not be best suited for the purpose of capturing nose pattern images. While most mobile device cameras do have some macro and/or wide angle capabilities, they may not be enough to capture minute nose pattern details in focus or even fit a bigger nose in the camera frame from very close. Moreover, macro photography generally has shallow depth of field (DOF), which is a problem when dealing with larger, more steeply curved noses as only a portion of the nose will be in focus.

Figure 8:
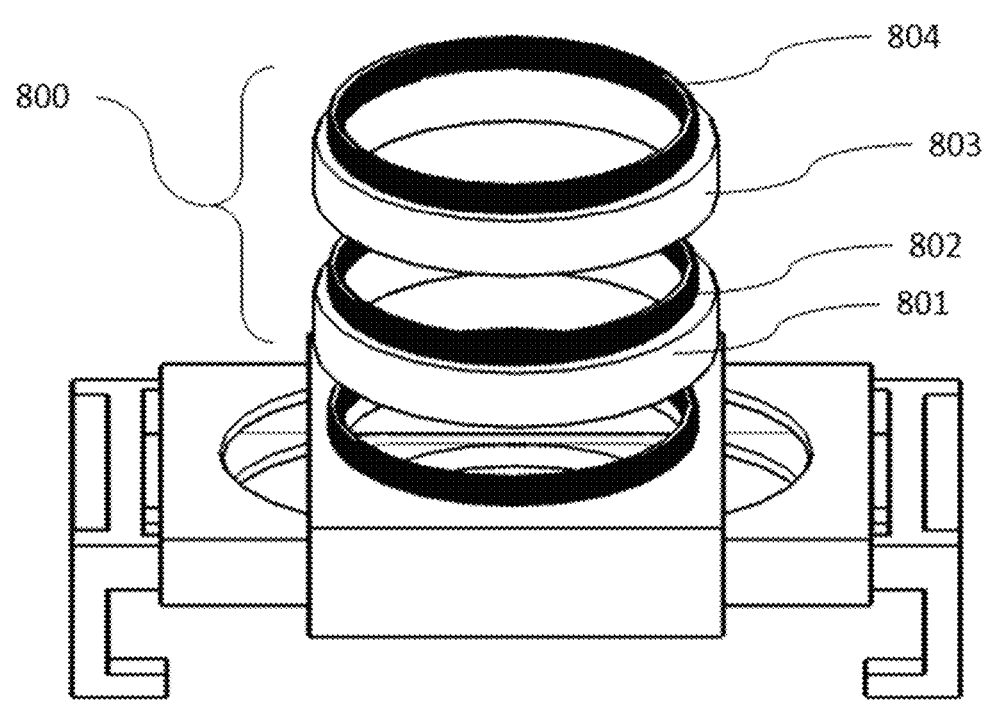
FIG. 8 illustrates a configuration of a lens attachment unit inserted between a mount unit and a shell unit.

Therefore, the apparatus may further comprise a lens attachment unit 700, placed over the camera and having one or more lenses, positioned above the slider subunit 401 between the mobile device's built-in camera lens and the subject animal nose (see FIG. 7) to address all of those issues. As shown in FIG. 8 the lens attachment unit 800 may comprise a lens module subunit 801, a tertiary mount subunit 802, an aperture subunit 803 and a quaternary mount subunit 804, and is mounted onto the slider subunit 401 using the secondary mount subunit 403 in alignment with the mobile device camera lens and the shell opening. The tertiary mount subunit 802 is similar to the secondary mount subunit 403, and is onto which additional parts like the shell unit 301 may be mounted.

Figure 9:
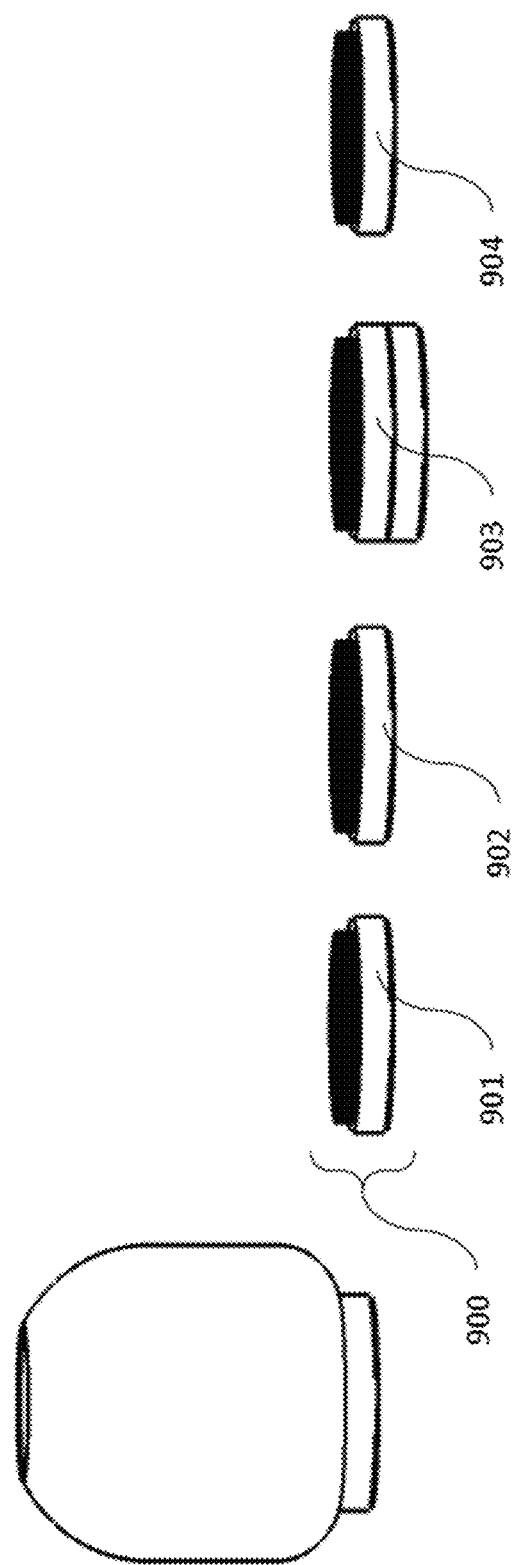
FIG. 9 illustrates possible configurations of a lens module subunit.

FIG. 9 illustrates a few possible embodiments of the lens module subunit 900, where it may comprise a macro lens 901, a wide angle lens 902, a stacked combination of macro and wide angle lenses 903, or a liquid lens 904. Each of the macro 901, wide angle 902, and liquid lens 904 may be used alone, or stacked in different combinations using the tertiary mount subunit 802 to form the desired lens attachment unit 800 that complements the specifications of the mobile device's camera.

As for DOF, it is generally dependent upon three factors: aperture value, focal length and subject distance. When the other two variables are fixed, a larger F-stop number (smaller aperture opening) results in a larger DOF; a longer focal length results in a smaller DOF; and shooting at close distance results in a smaller DOF. However in macro photography, DOF is mainly influenced by just two factors: aperture value and magnification. The higher the aperture value, or the higher the magnification ratio, the smaller the DOF gets; the DOF in macro photography is shallow because the magnifications are much larger than in standard photography.

Since nose pattern image photography by nature will generally not allow for the magnification ratio to be changed beyond a certain range, the key variable here is aperture. As illustrated in (a) of FIG. 10 as an embodiment of the lens attachment unit 1000, the aperture subunit 1002 lays on top of the lens module subunit 1001; and can be opened wider as in (b) of FIG. 10, or narrower as in (c) of FIG. 10, either manually with the attached lever 1004, 1005 or digitally. The quaternary mount subunit 1003 attached to the aperture subunit 1002 is similar to the tertiary mount subunit 802 and the secondary mount subunit 403, and is onto which additional parts like the shell unit 301 may be mounted.

The lens attachment unit may further comprise a focus adjuster subunit that changes the focal length of the lens system by adjusting the position of the lens module subunit in relation to the mobile device camera and/or the relative position of the lenses within the lens module subunit. The focal length of the lens system may be adjusted by changing the distance 1102, 1105 between the mobile device camera 1100, 1103 and lens module subunit 1101, 1104, as illustrated in FIG. 11; or by changing the distance 1204, 1205, 1210, 1211 between the lenses 1201, 1202, 1203, 1207, 1208, 1209 within the lens module subunit 1200, 1206 as in FIG. 12.

Figure 13:
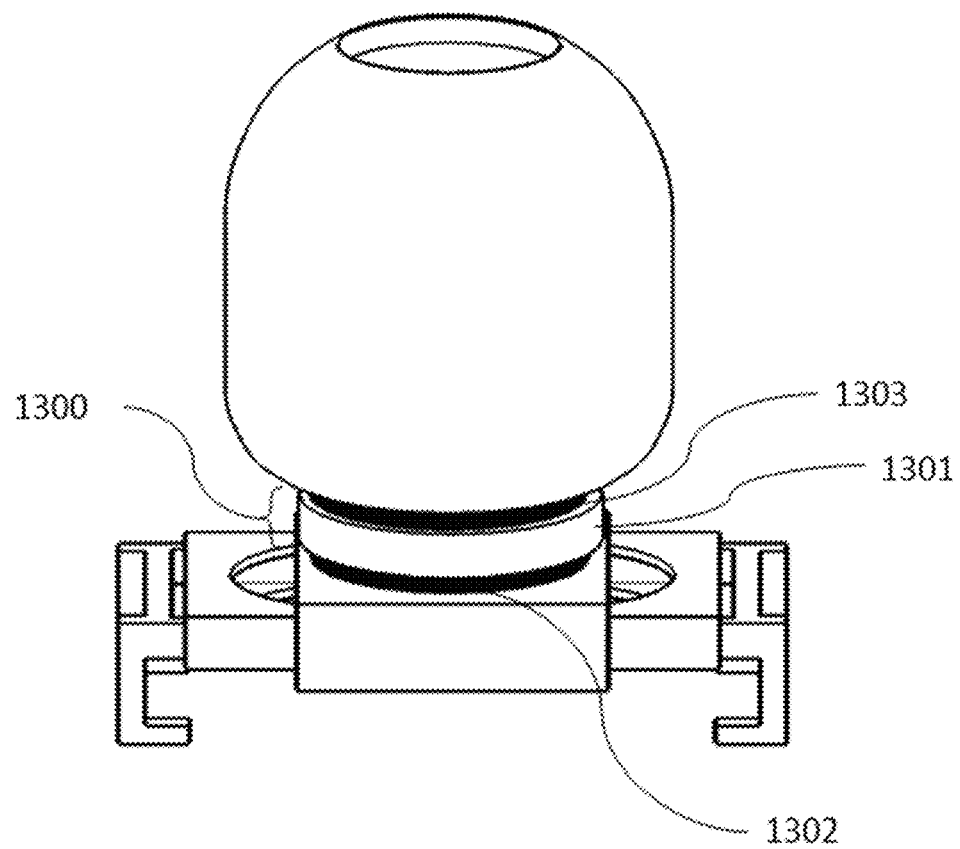
FIG. 13 illustrates an inclusion of a screw-type focus adjuster subunit in an overall assembly.

The screw-type focus adjuster subunit 1300 is illustrated in FIG. 13 wherein the mechanism for altering the distance between the lens attachment unit 1301 and the mobile device camera (or the distance between the lenses within the lens module subunit 801 if it has more than one lens stacked together) is simply screwing on tightly or loosely the parts onto the secondary mount subunit 1302 and/or the tertiary mount subunit 1303.

Figure 14:
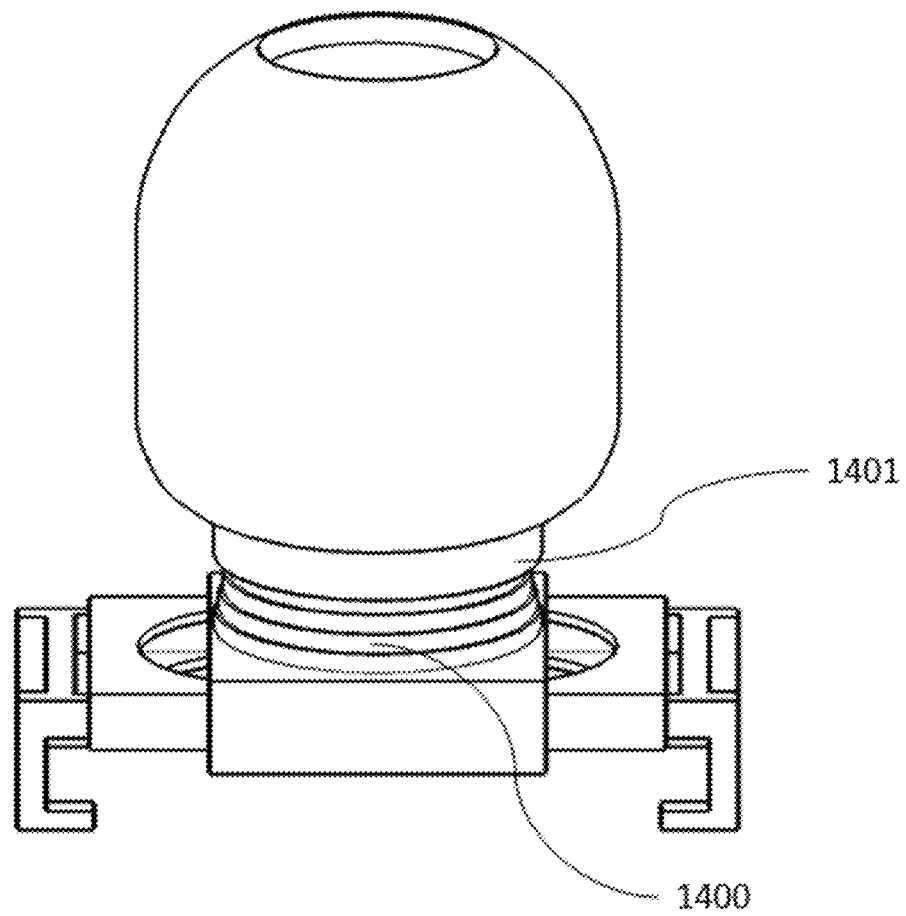
FIG. 14 illustrates an inclusion of a telescope-type focus adjuster subunit in an overall assembly.

The telescope-type focus adjuster subunit 1400 is illustrated in FIG. 14 and FIG. 15, wherein the lens attachment unit 1401 may be mounted onto the quinary mount subunit 1500, 1501 at the top end of the telescopic cylinder; or at the bottom mounted onto the secondary mount subunit 403, with the telescopic cylinder mounted onto the tertiary mount subunit 802 of the lens. If there are more than one lens components in the lens attachment unit, they may be stacked together to be placed at the top or bottom of the telescopic cylinder, or be mounted separately at the top and bottom. When the lens attachment unit 1401 is not placed at the bottom, the telescopic cylinder may be mounted onto the secondary mount subunit 403. The telescope may also be locked at various positions—such as fully collapsed as in (a) of FIG. 15, or fully expanded as in (b) of FIG. 15.

Figure 16:
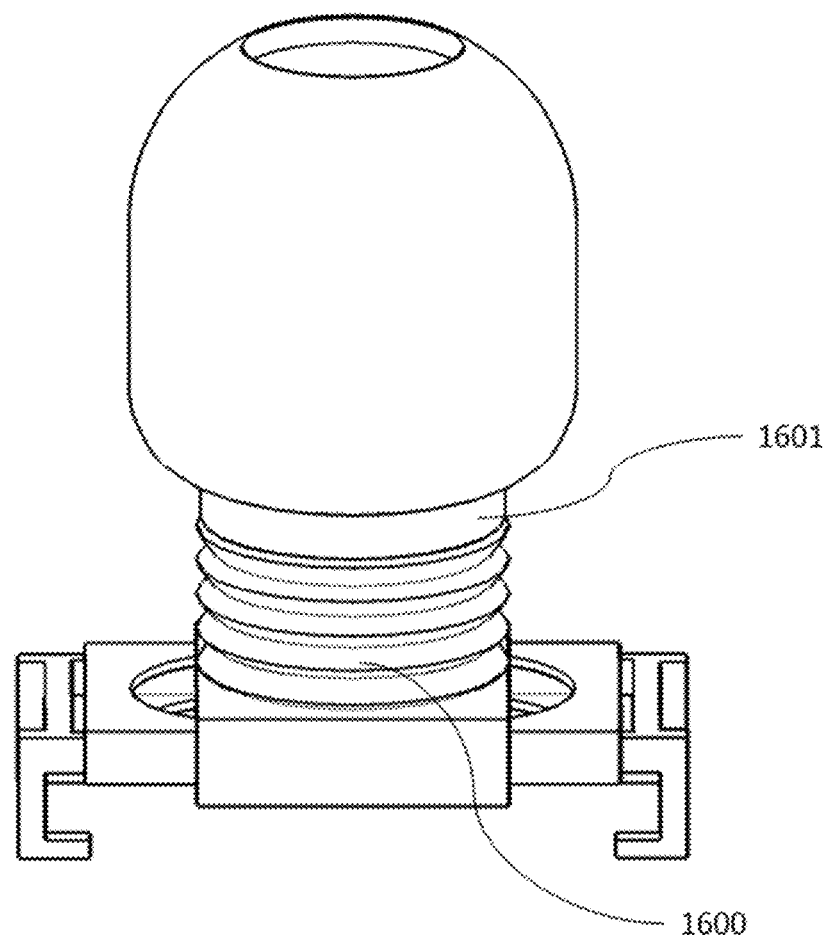
FIG. 16 illustrates an inclusion of an accordion-type focus adjuster subunit in an overall assembly.

The accordion-type focus adjuster subunit 1600 is illustrated in FIG. 16 and FIG. 17, wherein the lens attachment unit 1601 may be mounted onto the quinary mount subunit 1700, 1701 at the top end of the pleated layers of the accordion; or at the bottom mounted onto the secondary mount subunit 403, with the accordion mounted onto the tertiary mount subunit 802 of the lens. If there are more than one lens components in the lens attachment unit, they may be stacked together to be placed at the top or bottom of the accordion, or be mounted separately at the top and bottom. When the lens attachment unit 1601 is not placed at the bottom, the accordion may be mounted onto the secondary mount subunit 403. The accordion may also be locked at various positions—such as fully collapsed as in (a) of FIG. 17, or fully expanded as in (b) of FIG. 17—by being made of a relatively sturdy material that can keep its shape at various expansions.

The lens attachment unit may comprise the following combinations: the lens module subunit; the aperture subunit; the focus adjuster subunit; the lens module subunit and the aperture subunit; the lens module subunit and the focus adjuster subunit; the aperture subunit and the focus adjuster subunit; and the lens module subunit, the aperture subunit and the focus adjuster subunit.

Even with a perfectly fitting shell and/or lens attachment, however, it is likely that additional illumination will be necessary to acquire good quality nose images since nose patterns are minuscule details and the shell unit is meant to block stray light from the outside. As previously mentioned the shell unit may be translucent and allow some ambient light in, but it may not always be sufficient. Additionally, using illumination of specific ranges of wavelengths—UV, infrared, etc.—may yield the best quality nose pattern images. Therefore, the auxiliary apparatus may further comprise an illumination unit, although it will likely vary in shape and type depending on the other parts of the apparatus, such as the type of shell unit.

Figure 18:
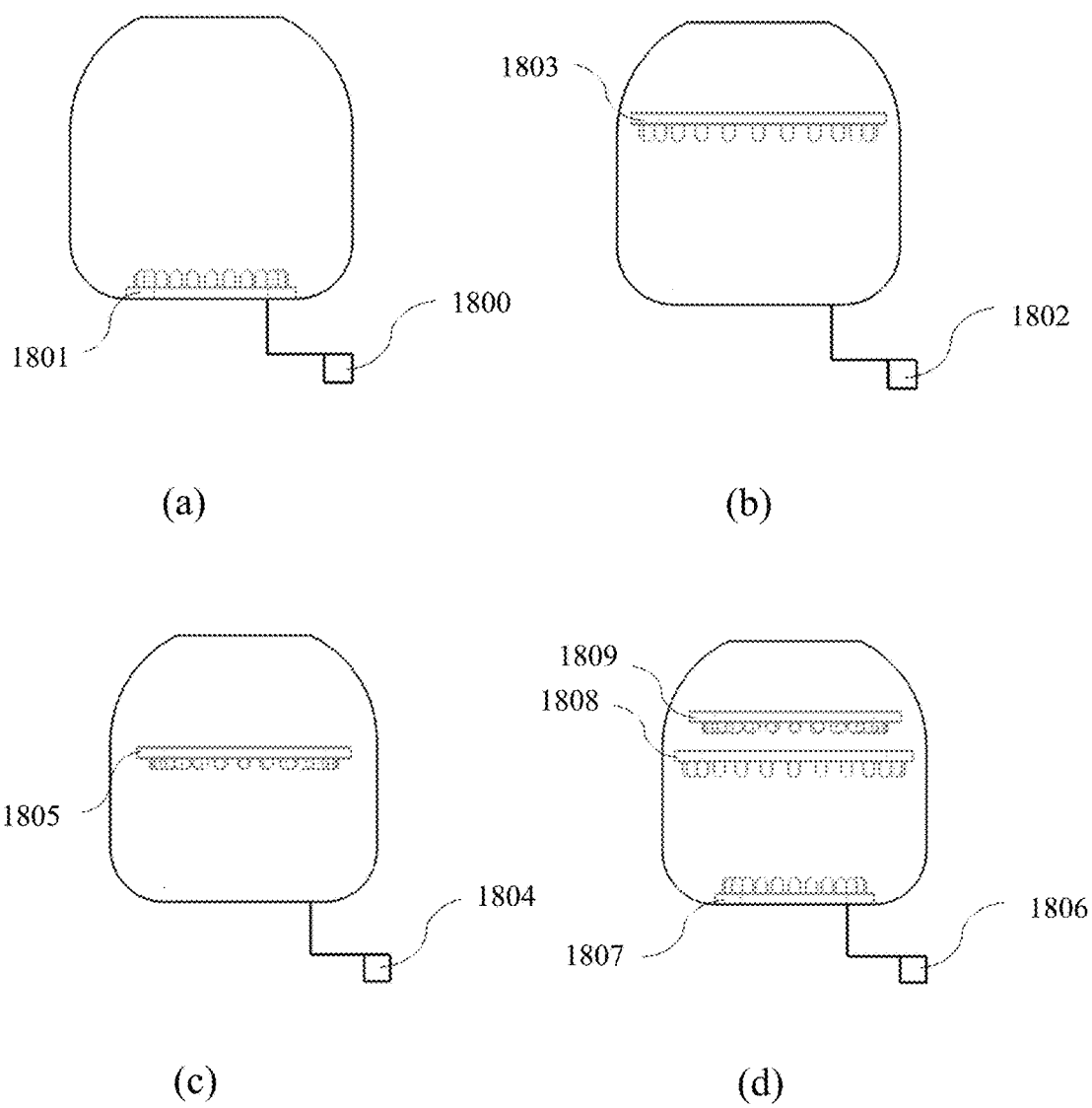
FIG. 18 illustrates an embodiment of an illumination unit for an interchangeable-type shell unit.

FIG. 18 illustrates an embodiment of the illumination unit, which provides additional light on the animal nose during capture, for the interchangeable-type shell unit 301. Due to the curved and textured nature of the animal nose, relying solely on illumination from straight on is not the best way to evenly light the whole of the nose surface with usable nose patterns. As such, the illumination unit may comprise a forward illumination subunit 1801, 1807, as shown in (a) of FIG. 18; a backward illumination subunit 1802, 1808, as shown in (b) of FIG. 18; and a lateral illumination subunit 1803, 1809, as shown in (c) of FIG. 18. As shown in (d) of FIG. 18, which shows all three orientations at once, it is possible to have more than one set of lights simultaneously. Each illumination orientation has its distinct advantages: forward illumination most effectively lights the front most areas; backward illumination has the effect of increasing the overall brightness without shining directly onto one area; and lateral illumination highlights the contrast between the valleys and ridges of nose patterns. The illumination unit may further comprise the power switch subunit 1800, 1802, 1804, 1806 which will allow the turning on and off of the lights directly without connecting to a mobile device app; this means the user may utilize the apparatus as a purely analog attachment to the mobile device camera while still using the illumination unit.

Figure 19:
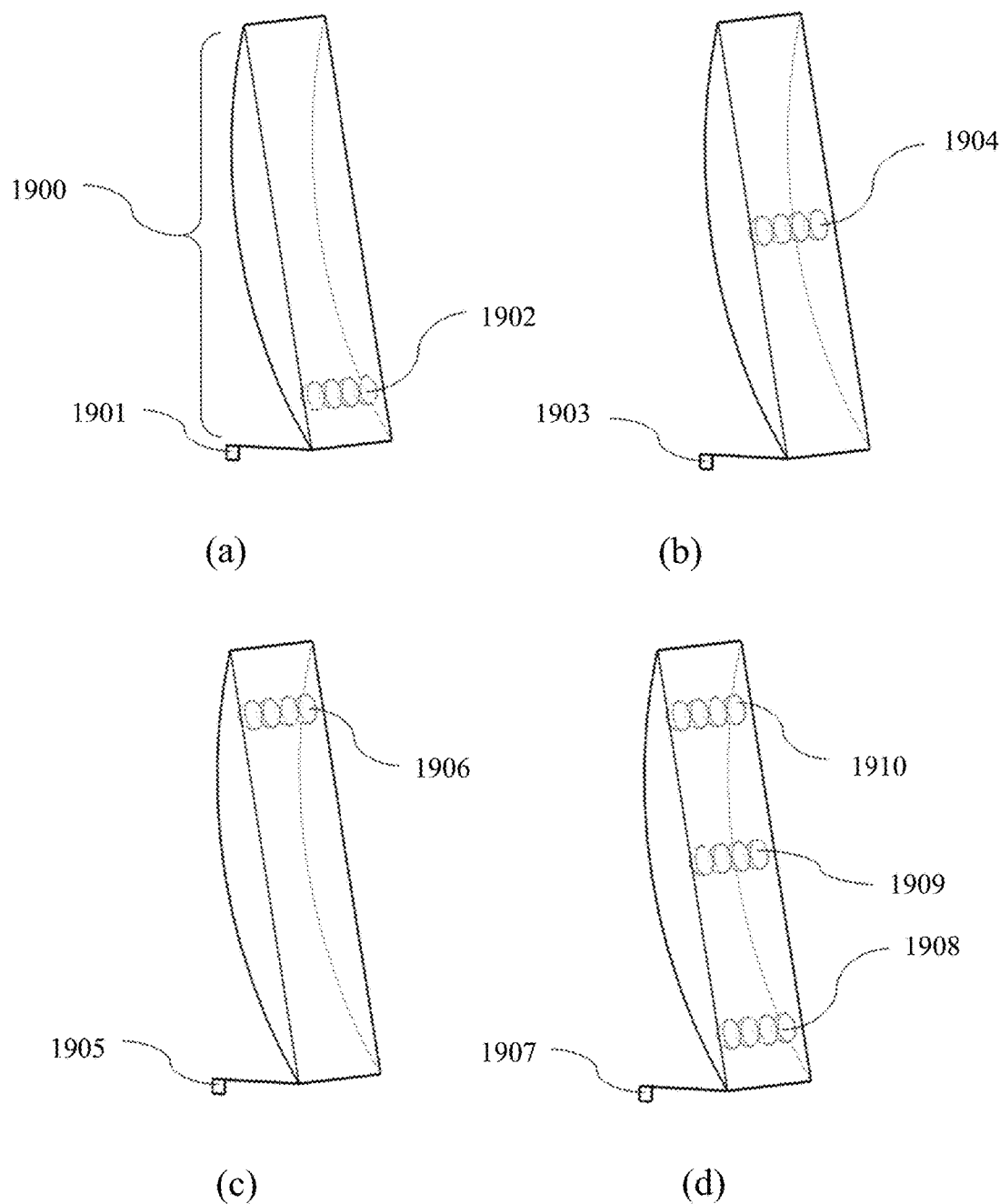
FIG. 19 illustrates an embodiment of an illumination unit for an aperture-type shell unit.

FIG. 19 illustrates an embodiment of the illumination unit for the aperture-type shell unit 301. Likewise, the illumination unit may comprise a forward illumination subunit 1902, 1908, as shown in (a) of FIG. 19; a backward illumination subunit 1903, 1909, as shown in (b) of FIG. 19; and a lateral illumination subunit 1904, 1910, as shown in (c) of FIG. 19. As shown in (d) of FIG. 19, which shows all three orientations at once, it is possible to have more than one set of lights simultaneously. Since the aperture-type comprises a set of separate flaps 1900, the illumination unit would be housed separately in each flap 1900 rather than on a contiguous rigid LED board like in FIG. 18. However, the power switch subunit 1901, 1903, 1905, 1907 will be connected to the entire illumination unit.

The illumination unit may comprise different combinations of the forward, backward and lateral illumination subunits: the forward illumination subunit used alone; the backward illumination subunit used alone; the lateral illumination subunit used alone; the forward illumination and backward illumination subunits; the forward illumination and lateral illumination subunits; the backward illumination and lateral illumination subunits; and the forward illumination, backward illumination and the later illumination subunits. In using any of the above combinations, each of the subunits may be turned on simultaneously, or separately in a predetermined sequence during capture.

As important is the orientation of the light sources, so is the even dispersion and concentration of illumination on the subject. As previously mentioned, a main function of the shell unit is to provide a controlled and ideal lighting environment for the capture of nose images. While the shell itself acts as the physical barrier to and regulator of ambient light from the outside, the shell unit may further comprise a diffuser subunit within to optimize the use of the illumination unit. Due to the ever-present layer of moisture on the nose surface, direct and indeliberate lighting has been found to cause bright reflections in the nose image that obscure the nose pattern. A remedy for this phenomenon is the use of a diffuser subunit within the shell unit, wherein the bare concentrated light passes through and/or reflects off of various materials and surfaces to result in diffused light by the time it reaches the subject animal nose. Diffusers disperse and randomize direct illumination to evenly light the subject animal nose, thus minimizing the appearance of glaring reflections from certain areas.

Figure 20:
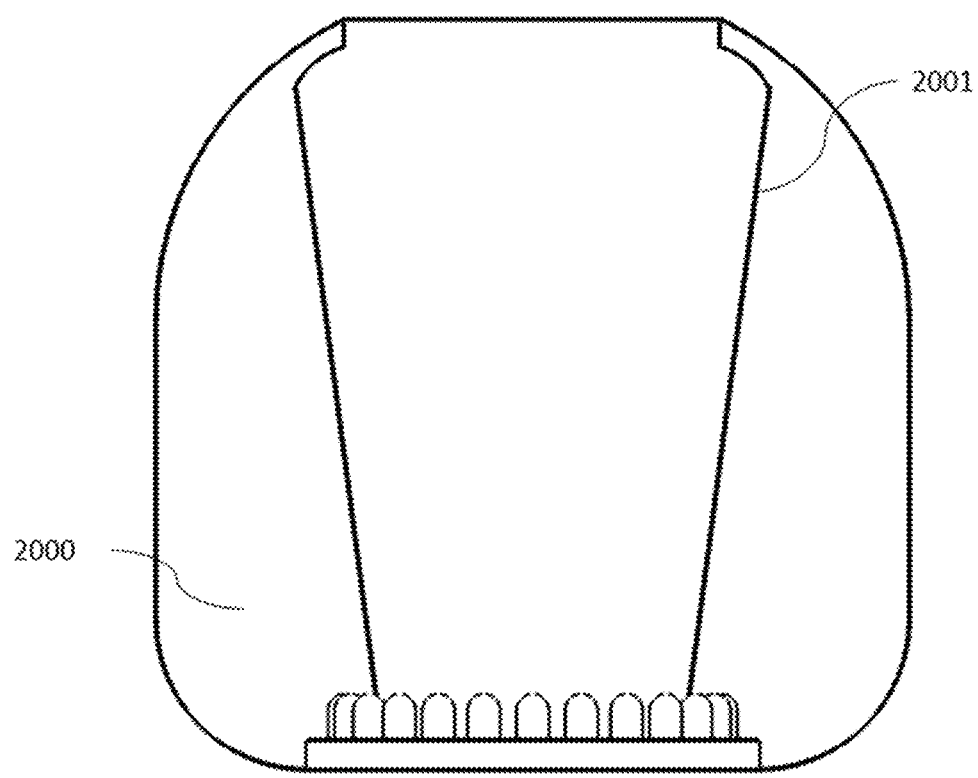
FIG. 20 illustrates a cross-sectional view of an embodiment of a diffuser subunit for an interchangeable-type shell unit.

FIG. 20 illustrates an embodiment of the diffuser subunit for the interchangeable-type shell unit 301, wherein the diffuser subunit is embedded in each shell. The inner walls 2000 comprise a reflective and/or refractive surface on which light from the illumination unit is reflected and/or refracted, and the diffuser membrane 2001 further disperses the light passing through before reaching the animal nose.

Figure 21:
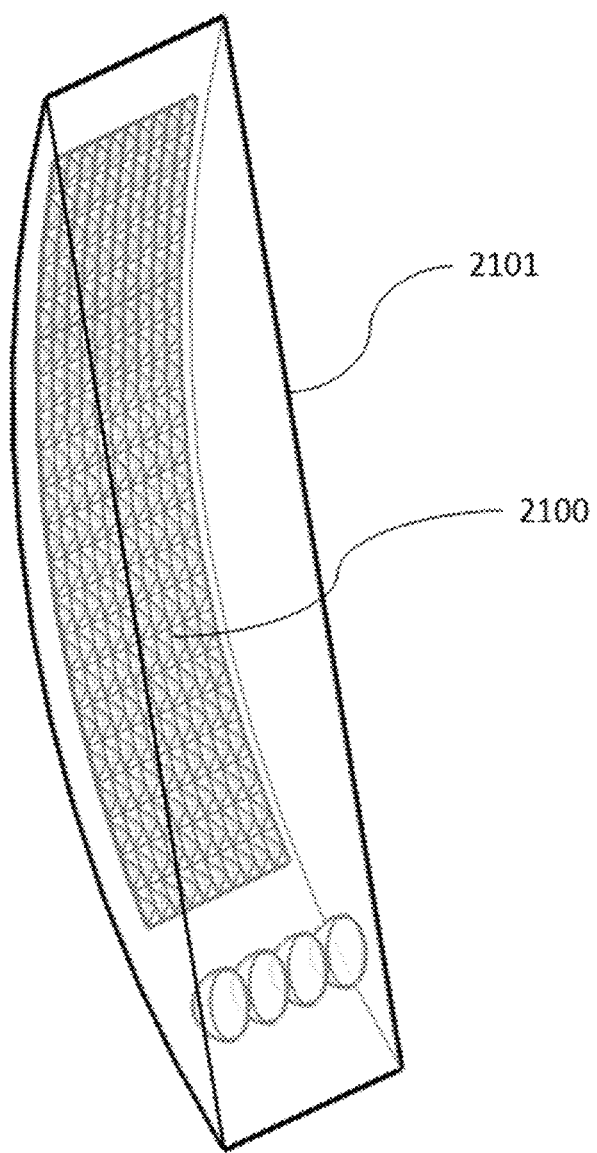
FIG. 21 illustrates an embodiment of a diffuser subunit for an aperture-type shell unit.
Figure 22:
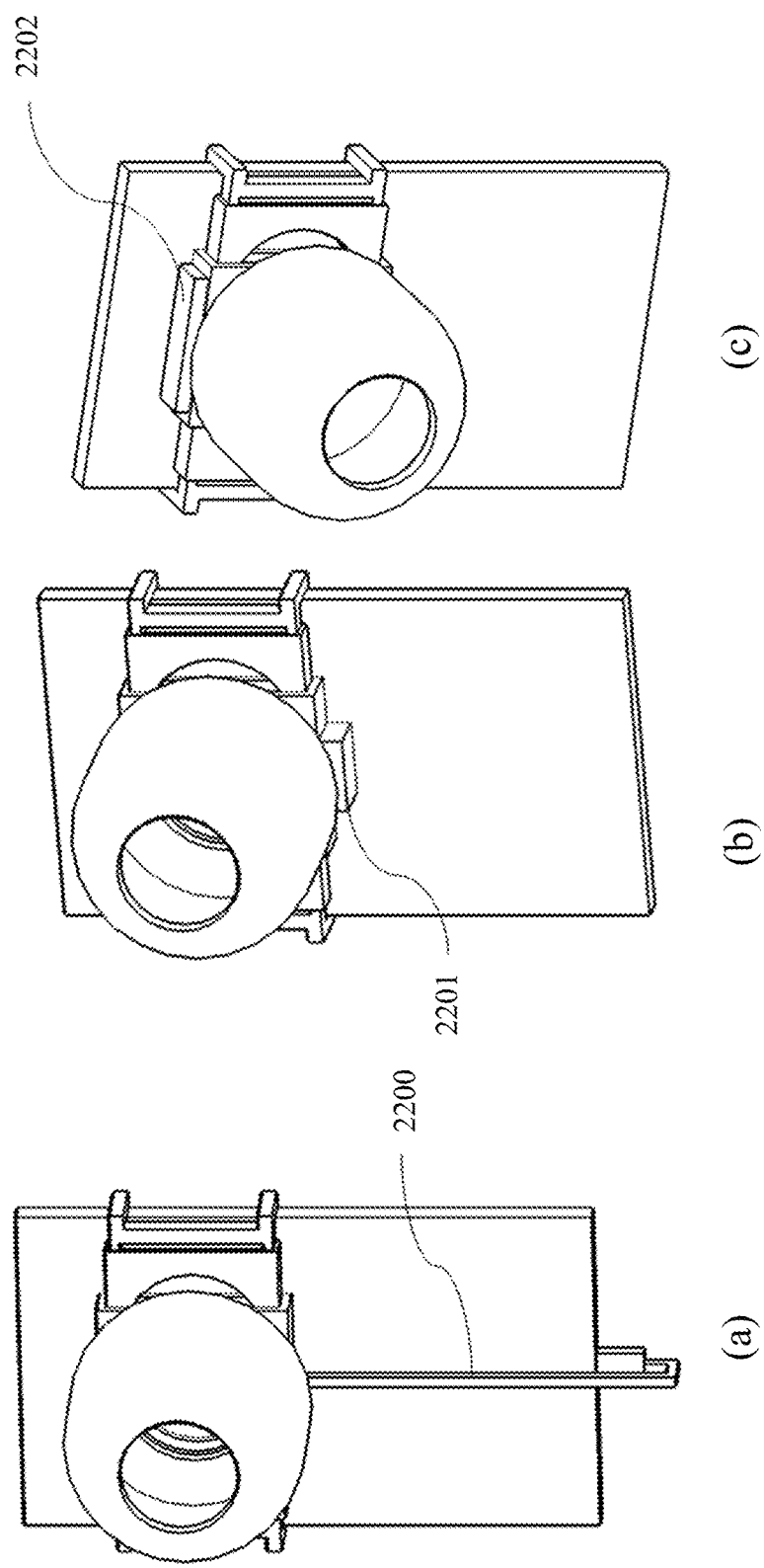
FIG. 22 illustrates an assembled view of an apparatus with a power unit, mounted onto a mobile device.

FIG. 21 illustrates an embodiment of the diffuser subunit for the aperture-type shell unit 301, wherein the diffuser subunit is embedded separately in each flap. The inner walls 2100 of each flap comprise a reflective and/or refractive surface on which light from the illumination unit is reflected and/or refracted, and the diffuser membrane 2101 further disperses the light passing through before reaching the animal nose.

With the introduction of the illumination unit and diffuser subunit, it is worth emphasizing again the importance of the shell unit. Even though technically it is not impossible to acquire good quality nose pattern images without a shell unit if the setting is just so, the point is that it is unrealistic and impractical to try to control the entirety of the environment every time one tries to capture a new nose image. Controlling the environment inside the shell unit, on the other hand, is much simpler and practical. A well-fitted shell unit, in particular, is useful; just as it is important to keep ambient light out, so it is to keep the illumination contained. Escaped light shining in on the eyes of the subject animal may be highly agitating, making the image capturing process more difficult. It thus follows that, especially for multi-directional and dispersed light, the shell opening should be as snug a fit to the subject animal's nose as possible.

It should be noted that the mount unit comprises a primary mount subunit that fastens onto the mobile device, a slider subunit onto which the shell unit, the lens attachment unit, or the illumination unit is fastened, and a base subunit onto which the primary mount subunit and the slider subunit are attached.

Moreover, the following combinations, used in conjunction with the mount unit, may comprise an embodiment of the present invention: the shell unit; the lens attachment unit; the illumination unit; the shell unit and the lens attachment unit; the shell unit and the illumination unit; the lens attachment unit and the illumination unit; and the shell unit, the lens attachment unit, and the illumination unit.

Parts of the present invention may be controlled electronically, including the illumination unit and the lens attachment unit 800; specifically, the aperture subunit 803 and the liquid lens 904 of the lens attachment unit may be controlled electronically. Therefore, for the electronically controlled components, the present invention may further comprise a power unit 2200, 2201 comprising a connection to the mobile device for drawing power, as in (a) of FIG. 22, a disposable or rechargeable battery as in (b) of FIG. 22, or one or more solar panels as in (c) of FIG. 22.

Figure 23:
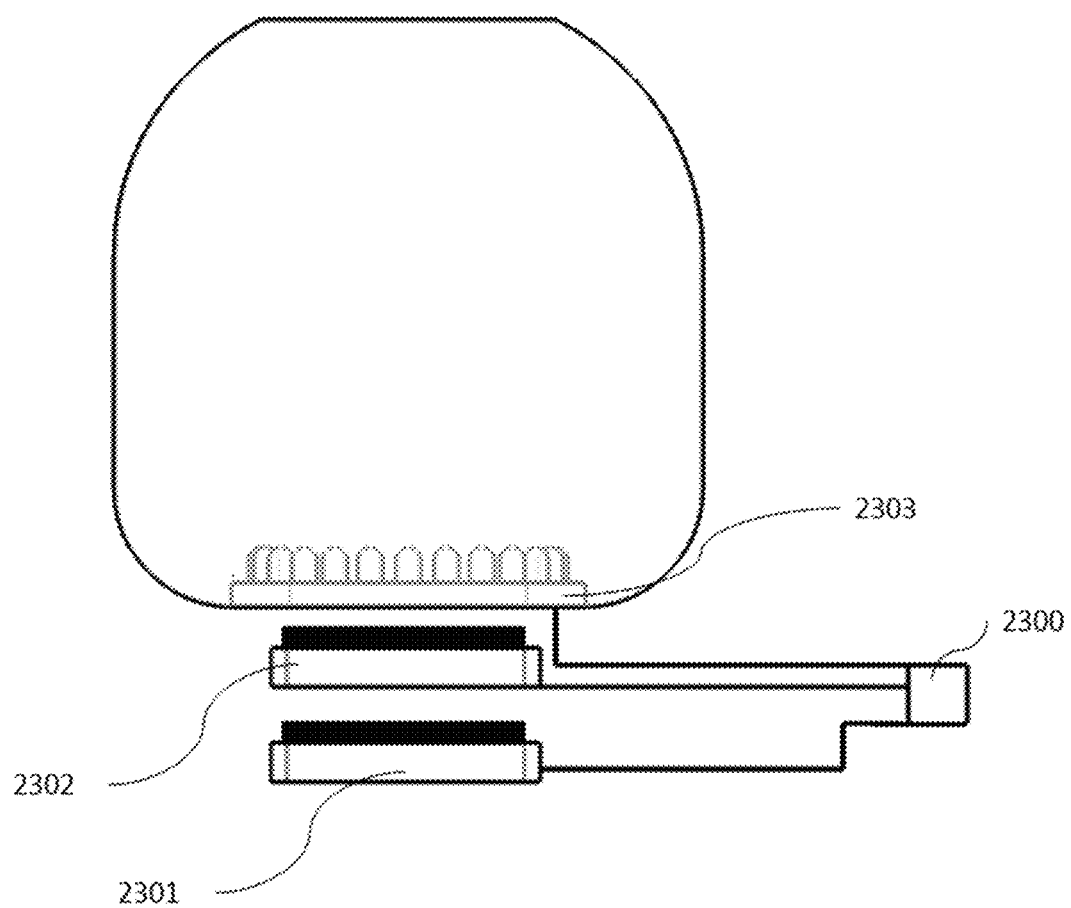
FIG. 23 illustrates a role of a control unit in operating an illumination unit, a liquid lens, and an aperture subunit.

Likewise, electronically controlling the illumination unit 2303, the liquid lens 2301 in the lens attachment unit 800, and the aperture subunit 2302, also requires a control unit 2300 comprising a microcontroller (MCU), volatile memory, non-volatile memory, or general-purpose input/output (GPIO), as shown in FIG. 23. The control unit further comprises a communication subunit that operates via a wired connection as in (a) of FIG. 24, or wireless connection via Wi-Fi, Bluetooth, or NFC to the mobile device as in (b) of FIG. 24, to send commands from a designated mobile application to the liquid lens 2400, 2403, aperture subunit 2401, 2404, and/or illumination unit 2402, 2405.

Figure 25:
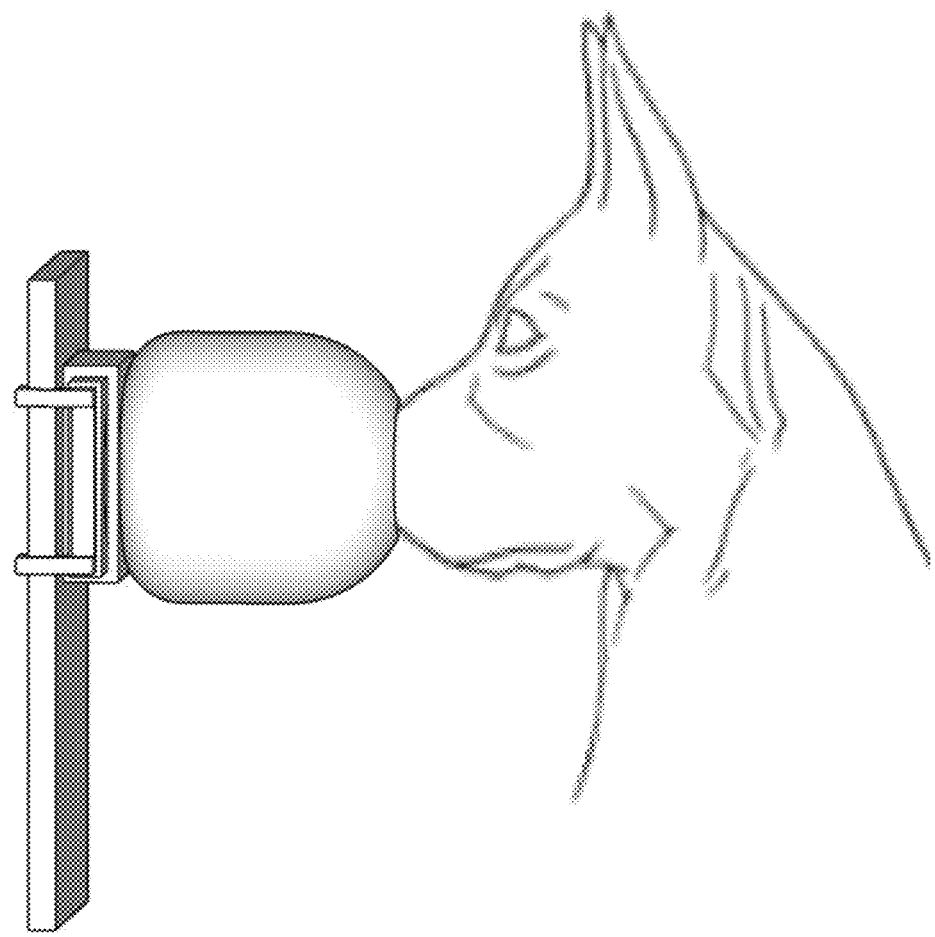
FIG. 25 illustrates an embodiment of the present invention used on a dog.

FIG. 25 illustrates an embodiment of the apparatus in use to acquire the nose pattern image of a dog.

The apparatus described herein may be implemented using hardware components, software components, and/or a combination thereof. For example, the apparatus described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The apparatus may run an operating system (OS) and one or more software applications that run on the OS. The apparatus also may access, store, manipulate, process, and create data in response to execution of the software. For purpose of simplicity, the description of the apparatus is used as singular; however, one skilled in the art will be appreciated that the apparatus may include multiple processing elements and/or multiple types of processing elements. For example, the apparatus may include multiple processors or a processor and a controller. In addition, different processing configurations are possible, such as parallel processors.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for capturing animal nose pattern images, the apparatus comprising:
   a mobile device equipped with a camera; and
   a mount unit attached to the mobile device,
   wherein the camera captures the animal nose pattern images,
   wherein the mount unit comprises:
   a primary mount subunit that fastens onto the mobile device;
   a slider subunit onto which a shell unit, a lens attachment unit, or an illumination unit is fastened; and
   a base subunit onto which the primary mount subunit and the slider subunit are attached.

2. The apparatus of claim 1, wherein the mount unit is used in conjunction with at least one component from the group consisting of:
   the shell unit connecting and enclosing a space between an animal nose and the camera of the mobile device;
   the lens attachment unit placed over the camera and having one or more lenses; and
   the illumination unit providing additional light on the animal nose.

3. The apparatus of claim 1, wherein the camera is a rear-facing camera.

4. The apparatus of claim 2, wherein the component is the shell unit.

5. The apparatus of claim 2, wherein the component is the lens attachment unit.

6. The apparatus of claim 2, wherein the component is the illumination unit.

7. The apparatus of claim 2, wherein the component is a combination of the shell unit and the lens attachment unit.

8. The apparatus of claim 2, wherein the component is a combination of the shell unit and the illumination unit.

9. The apparatus of claim 2, wherein the component is a combination of the lens attachment unit and the illumination unit.

10. The apparatus of claim 2, wherein the component is a combination of the shell unit, the lens attachment unit and the illumination unit.

11. The apparatus of claim 2, wherein the shell unit is translucent.

12. The apparatus of claim 2, wherein the shell unit is size-adjustable.

13. The apparatus of claim 2, wherein the shell unit further comprises a diffuser subunit.

14. The apparatus of claim 2, wherein:
the lens attachment unit comprises at least one component selected from the group consisting of a lens module subunit, an aperture subunit and a focus adjuster subunit, and
the focus adjuster subunit is a mechanism for adjusting a distance between the lenses in the lens module subunit or a mechanism for adjusting a distance between the camera and the lens module subunit.

15. The apparatus of claim 14, wherein the lens module subunit includes at least one component selected from the group consisting of a macro lens, a wide angle lens, and a liquid lens.

16. The apparatus of claim 2, wherein the shell unit comprises interchangeable-type parts with differently sized openings.

17. The apparatus of claim 2, wherein the shell unit comprises an aperture-type form that is tightened or loosened to adjust a size of an opening of the shell unit.

18. The apparatus of claim 2, wherein the illumination unit operates with at least one component selected from the group consisting of a forward illumination subunit, a backward illumination subunit, and a lateral illumination subunit.

19. The apparatus of claim 2, wherein at least one component from the group consisting of the illumination unit and the lens attachment unit is controlled electronically.

20. The apparatus of claim 19, further comprising a power unit and a control unit.

21. The apparatus of claim 20, wherein the power unit draws power from a disposable battery, a rechargeable battery, the mobile device, or a solar panel.

22. The apparatus of claim 20, wherein:
the control unit is a microcontroller (MCU), volatile memory, non-volatile memory,
or general-purpose input/output (GPIO), and
the control unit controls the liquid lens, the aperture subunit, and the illumination subunit.

23. The apparatus of claim 20, wherein the control unit further comprises a communication subunit that sends control commands from a designated mobile application through a wired connection or a wireless connection.

24. The apparatus of claim 1, wherein the component is the primary mount subunit.

25. The apparatus of claim 1, wherein the component is the primary mount subunit and the base unit.

26. The apparatus of claim 1, wherein the component is the primary mount subunit, the base unit, and the slider unit.

27. The apparatus of claim 1, wherein the component is the primary mount subunit, the base unit, and the slider unit, and the secondary mount subunit.

* * * * *